US012267863B2

United States Patent
Patil et al.

(10) Patent No.: US 12,267,863 B2
(45) Date of Patent: Apr. 1, 2025

(54) LOCATION AND LISTEN-BEFORE-SCHEDULE BASED RESOURCE ALLOCATION FOR VEHICLE-TO-VEHICLE COMMUNICATION

(71) Applicant: QUALCOMM Incorporated, San Diego, CA (US)

(72) Inventors: Shailesh Patil, San Diego, CA (US); Wei Guan, Bridgewater, NJ (US); Libin Jiang, Bridgewater, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 16/811,509

(22) Filed: Mar. 6, 2020

(65) Prior Publication Data

US 2020/0214023 A1 Jul. 2, 2020

Related U.S. Application Data

(63) Continuation of application No. 15/219,856, filed on Jul. 26, 2016, now Pat. No. 10,624,112.

(Continued)

(51) Int. Cl.
*H04W 72/12* (2023.01)
*H04W 72/02* (2009.01)
(Continued)

(52) U.S. Cl.
CPC ......... *H04W 72/569* (2023.01); *H04W 72/02* (2013.01); *H04W 72/044* (2013.01);
(Continued)

(58) Field of Classification Search
CPC ................. H04W 76/14; H04W 72/02; H04W 72/044; H04W 72/121; H04W 72/1242
(Continued)

(56) References Cited

U.S. PATENT DOCUMENTS 9,084,241 B2 7/2015 Madan et al.
2010/0135242 A1* 6/2010 Nam ..................... H04L 5/0039
370/330

(Continued)

FOREIGN PATENT DOCUMENTS

CN 101940045 A 1/2011
CN 103260258 A 8/2013
(Continued)

OTHER PUBLICATIONS

ERICSSON: "On scheduling for D2D communication", 3GPP Draft; R1-135808, 3rd Generation Partnership Project (3GPP), Mobile Competence Centre ; 650, Route Des Lucioles ; F-06921 Sophia-Antipolis Cedex; France vol. RAN WG1 Meeting #75, No. San Francisco, USA; Nov. 11, 2013-Nov. 15, 2013, Nov. 13, 2013 (Nov. 13, 2013), XP050735449, 3 pages. Retrieved from the internet: URL: http://www.3gpp.org/ftp/Meetings_3GPP_SYNC/RAN/RAN1/Docs [Retrieved on Nov. 13, 2013].

(Continued)

*Primary Examiner* — Christopher M Crutchfield
*Assistant Examiner* — Jean F Voltaire
(74) *Attorney, Agent, or Firm* — Arent Fox, LLP

(57) ABSTRACT

Methods, apparatus, and computer-readable mediums for wireless communication are provided. One apparatus is configured to receive at least one SA from at least one UE. The apparatus is further configured to determine an energy associated with each at least one SA. The apparatus is also configured to rank data transmission time-frequency resources based on the determined energy associated with (Continued)

said each received at least one SA. Each at least one SA are associated with a different subset of the data transmission time-frequency resources. The apparatus is further configured to select a set of data transmission time-frequency resources based on the ranked data transmission time-frequency resources and to send a data transmission on the selected set of data transmission time-frequency resources. Another apparatus is configured to partitioning time-frequency resources into different resource groups, to divide UEs into UE groups based on location, and map the UE groups to the resource groups.

13 Claims, 13 Drawing Sheets

Related U.S. Application Data

(60) Provisional application No. 62/222,666, filed on Sep. 23, 2015.

(51) Int. Cl.
    *H04W 72/044*     (2023.01)
    *H04W 72/121*     (2023.01)
    *H04W 72/566*     (2023.01)
    *H04W 76/14*     (2018.01)
    *H04W 84/00*     (2009.01)

(52) U.S. Cl.
    CPC ......... *H04W 72/121* (2013.01); *H04W 76/14* (2018.02); *H04W 84/005* (2013.01)

(58) Field of Classification Search
    USPC .......................................................... 370/330
    See application file for complete search history.

(56) References Cited

U.S. PATENT DOCUMENTS

| | | | | |
|---|---|---|---|---|
| 2013/0265984 | A1* | 10/2013 | Li | H04W 4/70 370/336 |
| 2014/0086158 | A1 | 3/2014 | Tavildar et al. | |
| 2015/0245334 | A1 | 8/2015 | Chang | |
| 2015/0264708 | A1 | 9/2015 | Li et al. | |
| 2015/0341957 | A1* | 11/2015 | Tang | H04W 48/12 370/329 |
| 2016/0018327 | A1 | 1/2016 | Hogan | |
| 2016/0044694 | A1* | 2/2016 | Park | H04W 72/56 370/329 |
| 2016/0174122 | A1* | 6/2016 | Sorrentino | H04W 36/22 370/331 |
| 2016/0183276 | A1* | 6/2016 | Marinier | H04W 72/12 370/329 |
| 2016/0295624 | A1* | 10/2016 | Novlan | H04L 67/12 |
| 2016/0302223 | A1* | 10/2016 | Song | H04W 72/535 |
| 2017/0041971 | A1 | 2/2017 | Kim et al. | |
| 2017/0086216 | A1 | 3/2017 | Patil et al. | |
| 2018/0042062 | A1* | 2/2018 | Matsumoto | H04W 8/005 |

FOREIGN PATENT DOCUMENTS

| | | | |
|---|---|---|---|
| CN | 104883743 A | 9/2015 | |
| EP | 3515135 A1 | 7/2019 | |
| JP | 2013533709 A | 8/2013 | |
| JP | 2014511646 A | 5/2014 | |
| KR | 20130064776 A | 6/2013 | |
| KR | 20130123430 A | 11/2013 | |
| WO | 2013177179 A1 | 11/2013 | |
| WO | 2014052456 A1 | 4/2014 | |
| WO | 2014187336 A1 | 11/2014 | |
| WO | 2015021185 A1 | 2/2015 | |
| WO | 2015065281 A1 | 5/2015 | |
| WO | 2015065632 A1 | 5/2015 | |
| WO | 2015115505 A1 | 8/2015 | |
| WO | WO-2015168028 A1 * | 11/2015 | ............ H04W 16/14 |

OTHER PUBLICATIONS

ETRI: "Discussion of Sensing Algorithms for mode 2 Resource Selection", 3GPP Draft; R1-143051, 3rd Generation Partnership Project (3GPP), Mobile Competence Centre ; 650, Route Des Lucioles ; F-06921 Sophia-Antipolis Cedex; France vol. RAN WG1 Meeting #78, No. Dresden, Germany; Aug. 18, 2014-Aug. 22, 2014, Aug. 17, 2014 (Aug. 17, 2014), XP050788530, 5 pages. Retrieved from the Internet: URL: http://www.3gpp.org/ftp/Meetings_3GPP_SYNC/RAN1/Docs/ -[retrieved on Aug. 17, 2014].
European Search Report—EP18198827—Search Authority—The Hague—Dec. 20, 2018.
International Search Report and Written Opinion—PCT/US2016/044294—ISA/EPO—Jan. 25, 2017.
Partial International Search Report—PCT/US2016/044294—ISA/EPO—Oct. 14, 2016.
Taiwan Search Report—TW105123749—TIPO—Dec. 25, 2019.
Fujitsu: "Discussion of RRM Measurement for D2D Communication", 3GPP TSG-RAN WG1#77, R1-142071, May 23, 2014, pp. 1-6, URL: http://www.3gpp.org/ftp/tsg_ran/WG1_RL1/TSGR1_77/Docs//R1-142071.zip.
Ericsson: "On Scheduling Procedure for D2D", 3GPP Draft, 3GPP TSG-RAN WG1 Meeting #76, R1-140778, On Scheduling Procedure For D2D, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Feb. 10, 2014-Feb. 14, 2014, Feb. 9, 2014 (Feb. 9, 2014), XP050736279, 5 pages, URL: http://www.3gpp.org/ftp/tsg_ran/WG1_RL1/TSGR1_76/Docs/R1-140778.zip.
Samsung: "Mode 2 Resource Allocation for D2D Broadcast Communication", 3GPP Draft, 3GPP TSG RAN WG1 Meeting #78, R1-143084, vol. RAN WG1, No. Dresden, Germany, Aug. 18, 2014-Aug. 22, 2014, Aug. 17, 2014 (Aug. 17, 2014), XP050788563, 4 Pages, Retrieved from the Internet: URL: http://www.3gpp.org/ftp/Meetings_3GPP_SYNC/RAN1/Docs/ [retrieved on Aug. 17, 2014].
Taiwan Search Report—TW109109080—TIPO—Feb. 28, 2021.
LG Electronics: "On the Resource Pool Configuration for D2D Communications", 3GPP TSG RAN WG1 Meeting #76, R1-140825, Prague, Czech Republic, Feb. 10-14, 2014, pp. 1-13.
Panasonic: "Time/Frequency Hopping for D2D Communication/SA", 3GPP TSG RAN WG1 Meeting #78, R1-143000, Dresden, Germany, Aug. 18-22, 2014, 4 Pages.

* cited by examiner

Device-to-Device (Vehicle-to-Vehicle) Communications System

LOCATION AND LISTEN-BEFORE-SCHEDULE BASED RESOURCE ALLOCATION FOR VEHICLE-TO-VEHICLE COMMUNICATION

CROSS-REFERENCE TO RELATED APPLICATION(S)

This application is a Continuation of U.S. patent application Ser. No. 15/219,856, entitled "LOCATION AND LISTEN-BEFORE-SCHEDULE BASED RESOURCE ALLOCATION FOR VEHICLE-TO-VEHICLE COMMUNICATION" and filed on Jul. 26, 2016, which claims the benefit of U.S. Provisional Application Ser. No. 62/222,666, entitled "Location and Listen-Before-Schedule Based Resource Allocation for Vehicle-to-Vehicle Communication" and filed on Sep. 23, 2015, each of which is expressly incorporated by reference herein in its entirety.

BACKGROUND

Field

The present disclosure relates generally to communications systems, and more particularly, to resource allocation for vehicle-to-vehicle (V2V) communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Simulation results for V2V communication using current communication systems suggest that current resource selection methods may not lead to good performance. Accordingly, new resource allocation mechanism may improve performance for V2V communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As discussed above, simulation results for V2V communication using current communication systems suggest that current resource selection methods may not lead to good performance. Current resource selection methods, which randomly select both the Scheduling Assignment (SA) and the time domain resource pattern of transmission (T-RPT) patterns, do not lead to good performance. Some examples described herein provide new resource allocation mechanism that may improve performance in some cases.

In an aspect of the disclosure, a method, a computer-readable medium, and an apparatus are provided. The apparatus is configured to receive at least one scheduling assignment (SA) from at least one UE. The apparatus is further configured to determine an energy associated with each received at least one SA. The apparatus is configured to rank data transmission time-frequency resources based on the determined energy associated with said each received at least one SA. The each received at least one SA is associated with a different subset of the data transmission time-frequency resources. The apparatus is further configured to select a set of data transmission time-frequency resources based on the ranked data transmission time-frequency resources. The apparatus is further configure to send a data transmission on the selected set of data transmission time-frequency resources.

In an aspect of the disclosure, another method, another computer-readable medium, and another apparatus are provided. The apparatus is configured to partition time-frequency resources into different resource groups. The resource groups are partitioned in the time domain. The apparatus is configured to divide vehicle UEs into vehicle UE groups based on vehicle UE location and to map the vehicle UE groups to the resource groups.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
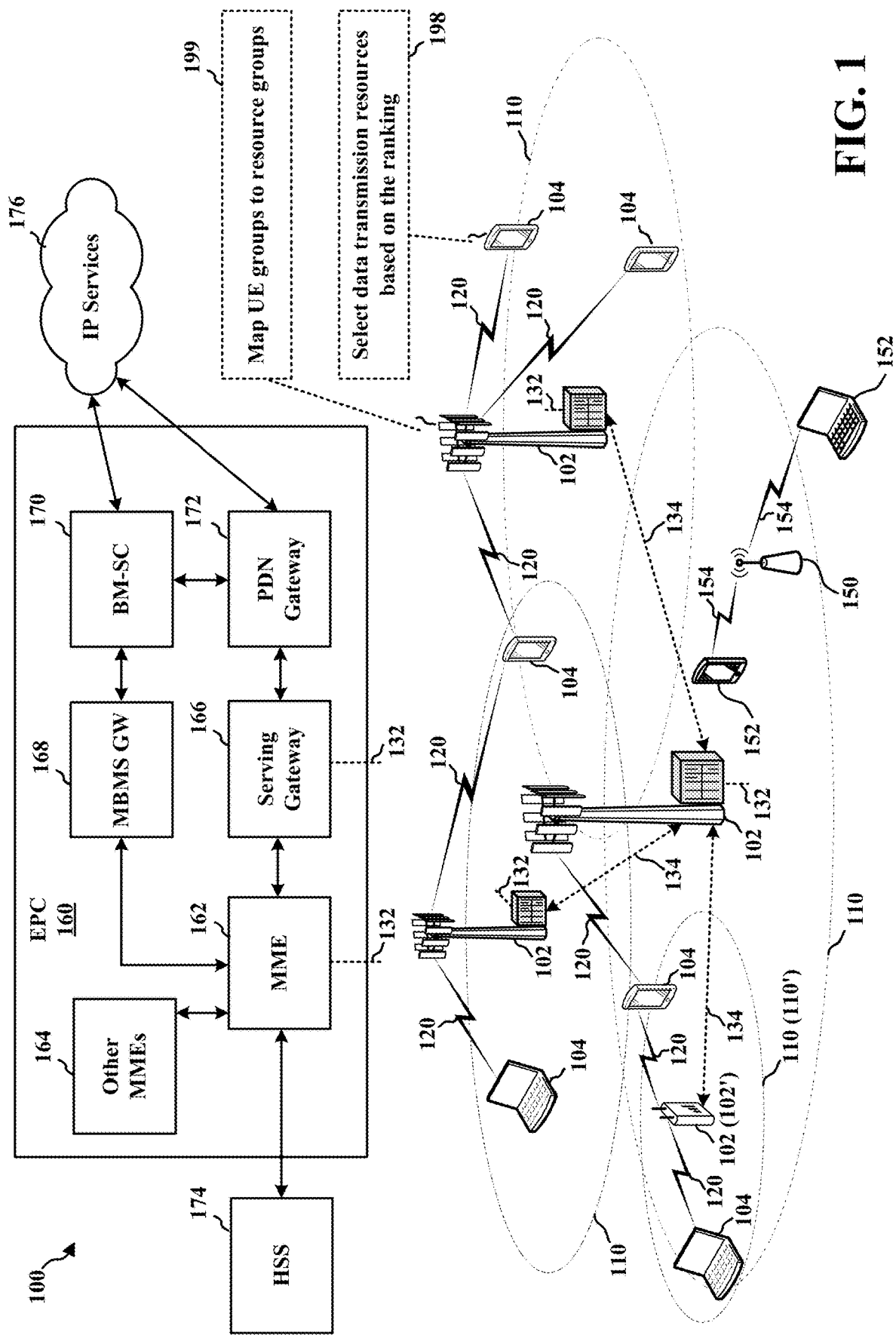
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include UL (also referred to as reverse link) transmissions from a UE 104 to a base station 102 and/or DL (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yz MHz (z component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/Wi-Fi AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to select data transmission resources based on a ranking (198). For example, a UE 104 may determine an energy associated with each received at least one SA. The UE 104 is also configured to rank data transmission time-frequency resources based on the determined energy associated with said each received at least one SA. The each received at least one SA are associated with a different subset of the data transmission time-frequency resources. The UE 104 is further configured to select a set of data transmission time-frequency resources based on the ranked data transmission time-frequency resources and to send a data transmission on the selected set of data transmission time-frequency resources.

In certain other aspects, the eNB 102 may be configured to map UE groups to resource groups (199). For example, an eNB 102 may partition time-frequency resources into different resource groups. The resource groups may be partitioned in the time domain. The eNB 102 may divide UEs 104 (which may be in vehicles) into vehicle UE groups based on vehicle location. The eNB 102 may map the vehicle UE groups to the resource groups.

Figure 2:
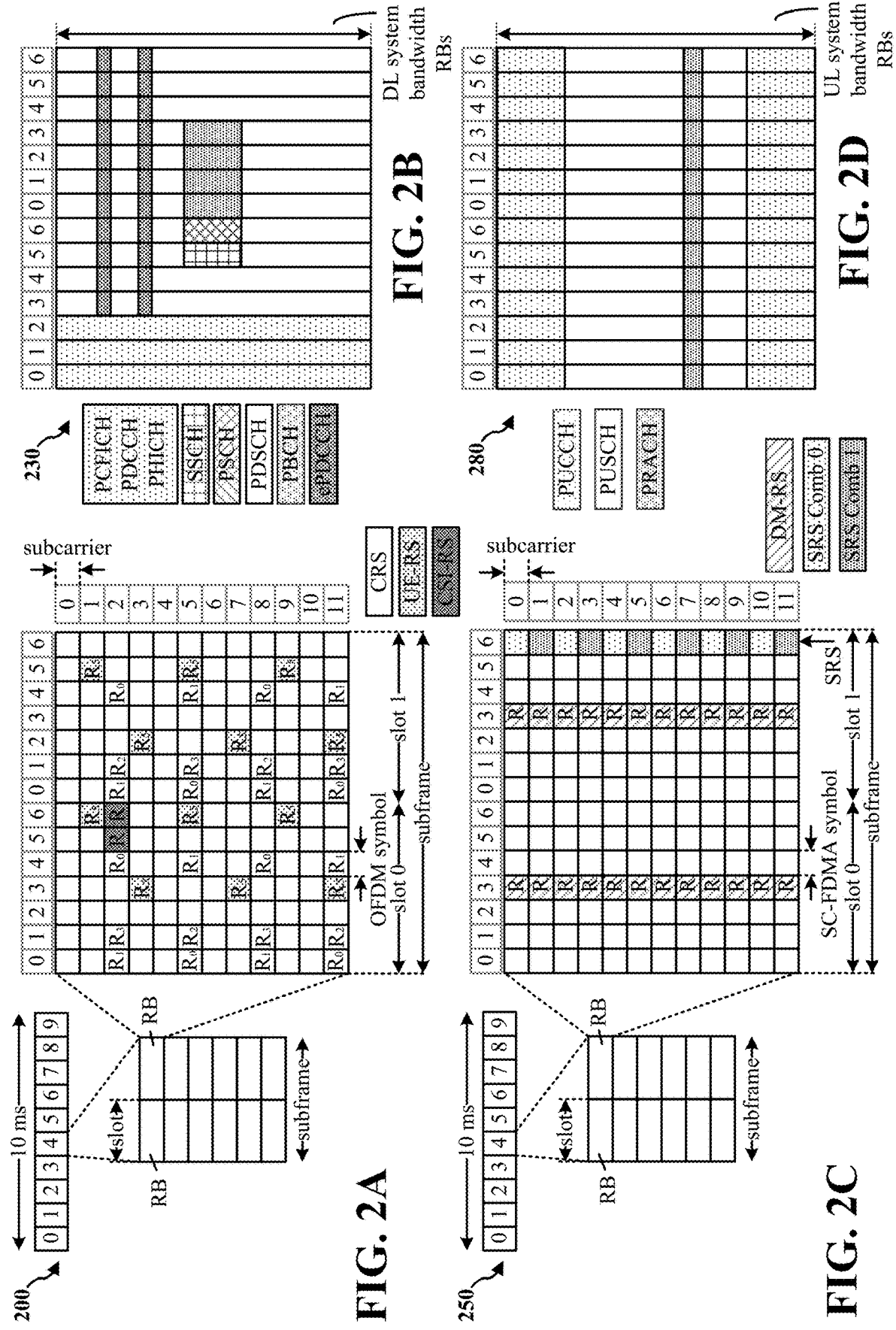
FIGS. 2A, 2B, 2C, and 2D are diagrams illustrating LTE examples of a down link (DL) frame structure, DL channels within the DL frame structure, an uplink (UL) frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
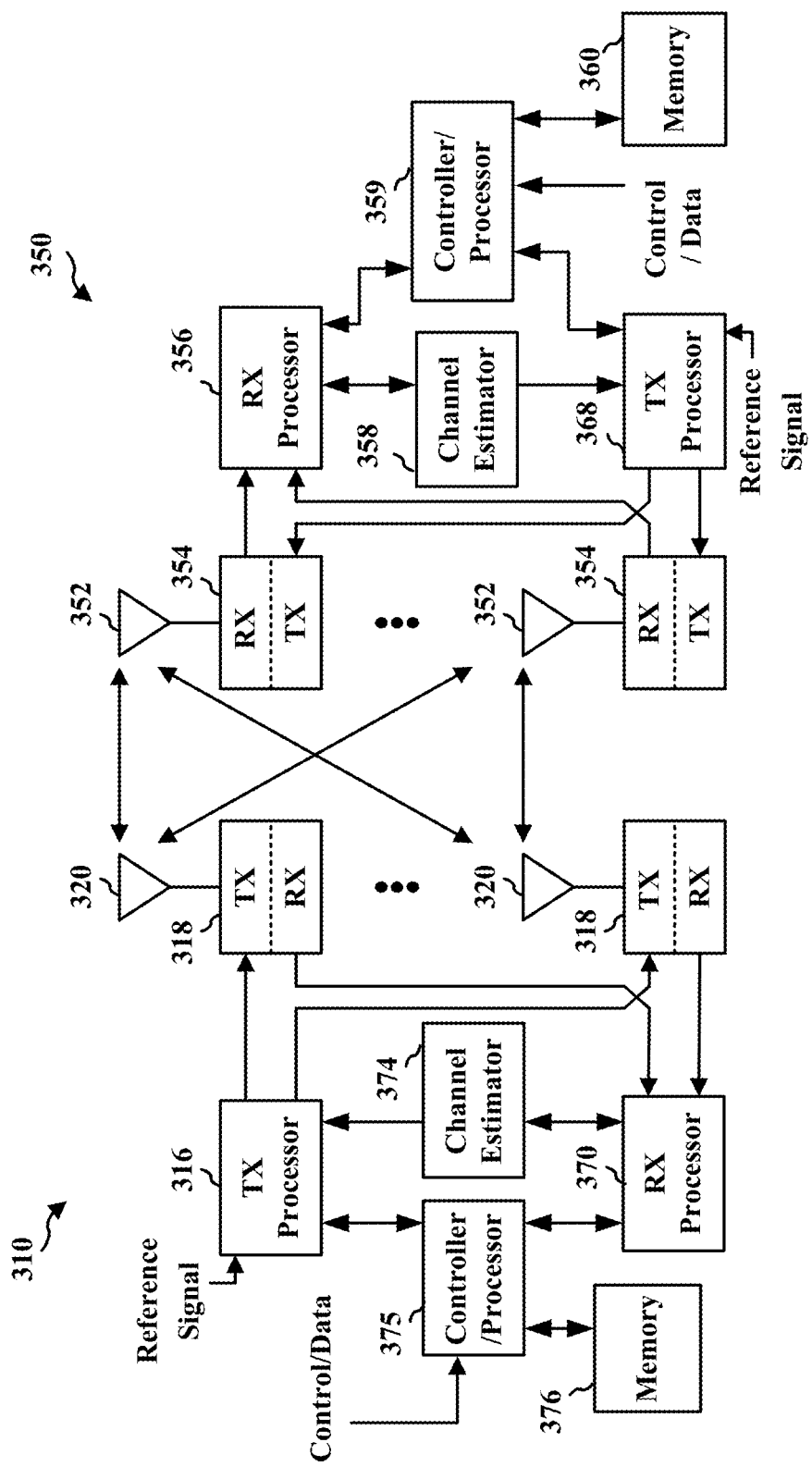
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to an RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
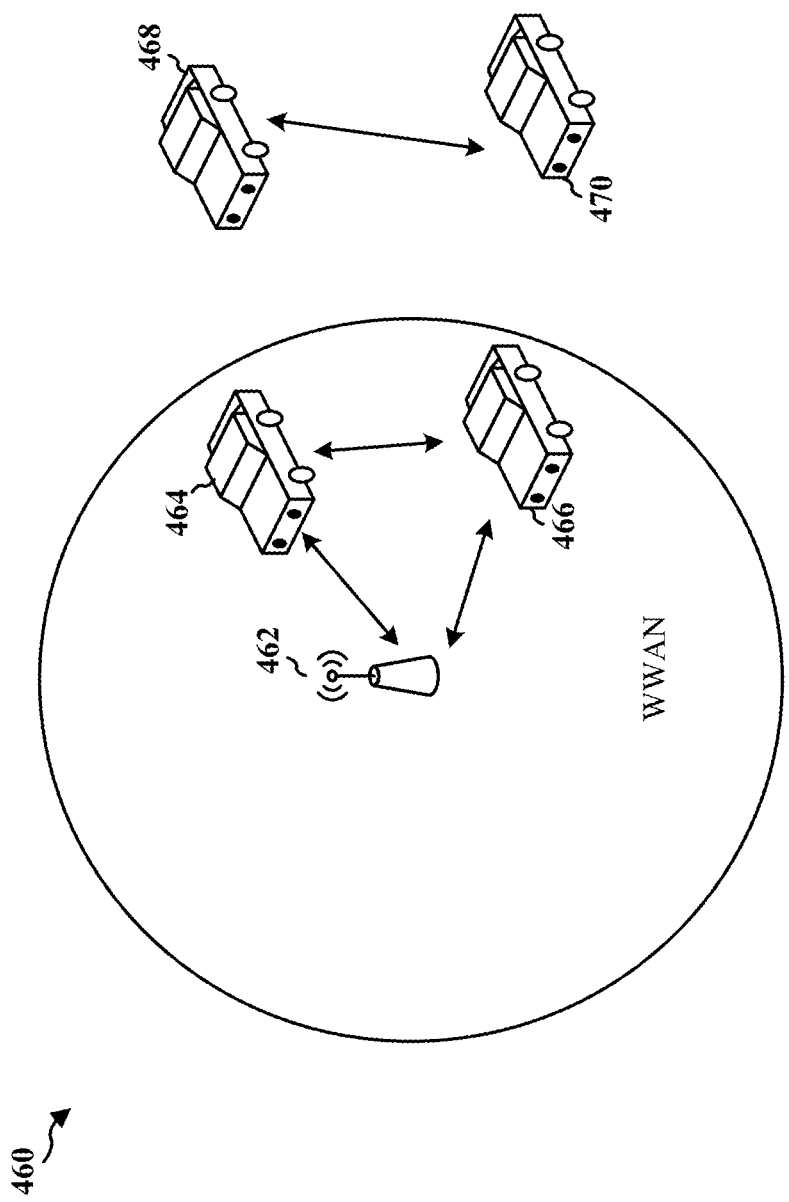
FIG. 4 is a diagram of a device-to-device communications system.

FIG. 4 is a diagram of a vehicle-to-vehicle (V2V) communications system 460. The V2V communications system 460 includes a plurality of UEs 464, 466, 468, 470 (installed in vehicles). The V2V communications system 460 may overlap with a cellular communications system, such as for example, a WWAN. Some of the UEs 464, 466, 468, 470 may communicate together in V2V communication using the DL/UL WWAN spectrum, some may communicate with the base station 462, and some may do both. For example, as shown in FIG. 4, the UEs 468, 470 are in V2V communication and the UEs 464, 466 are in V2V communication. The UEs 464, 466 are also communicating with the base station 462. The V2V communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless V2V communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 5:
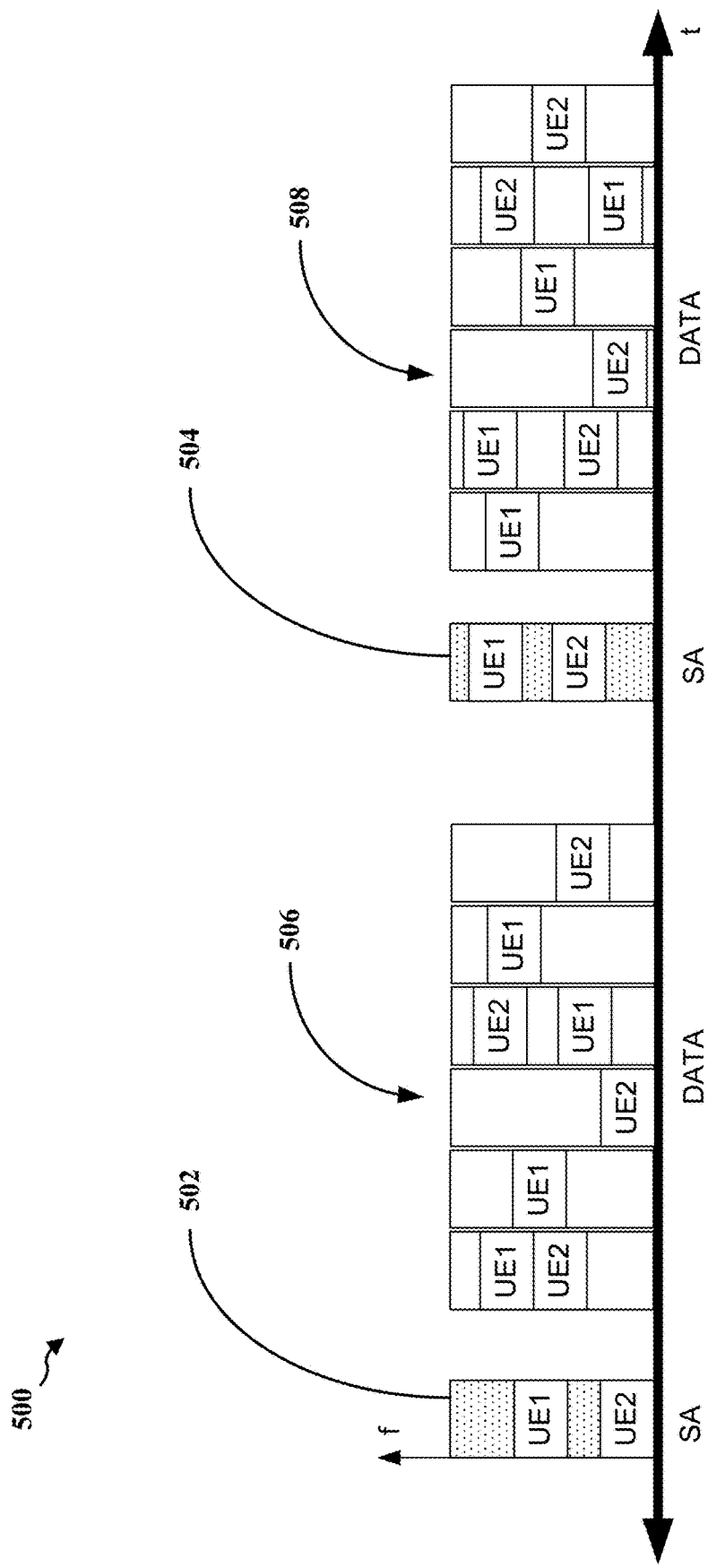
FIG. 5 is a diagram illustrating an example time-frequency resources.

FIG. 5 is a diagram 500 illustrating an example of time-frequency resources. The x-axis may be time and the y-axis may be frequency. Accordingly, the diagram 500 illustrates an example of available times and available frequencies, i.e., time-frequency resources, that may be used for communications transmissions. The example of time-frequency resources may be illustrative of existing LTE direct (LTE-D) time-frequency resources in a licensed band. LTE-D device-to-device (D2D) communication was standardized in Release 12 of the LTE standard. One of the components standardized in Release 12 of the LTE standard was D2D communication in the licensed band. (When devices in D2D communication are installed in vehicles, the communication may be referred to as V2V communication.)

Under LTE Release 12, LTE-D may include SA transmissions 502, 504 and data transmissions 506, 508. In some examples, SA transmissions 502, 504 may be used for transmissions of control information. Data transmissions 506, 508 may be used to transmit, for example, user data or other data. The SA transmissions 502, 504 and data transmissions 506, 508 may be transmitted from device to device, e.g., directly.

An example network may reserve separate resources for each channel. These channels may be pools of reserved network resources that may occur periodically. For example, these network resources may be time-frequency resources. These time-frequency resources may be split into blocks of time and frequency such as the blocks of time-frequency resources used by UE1 and UE2 as illustrated in FIG. 5, i.e., the rectangles labeled "UE1" and "UE2" that represent combinations of time and frequency (time and frequency "locations") for possible transmissions by UE1 and/or UE2. (Not all possible blocks are assigned to UE1 or UE2 in FIG. 5.) The blocks of time and frequency are RBs.

Before transmitting data, a UE may need to broadcast the SA transmissions 502, 504 in its resource pool. The SA transmissions 502, 504 may be used by other UEs to learn about the data being transmitted. The SA transmissions 502, 504 may include information such as the time and frequency location of transmissions, e.g., for the data transmissions 506, 508; modulation; coding schemes; and other transmission information.

To indicate the time information of the resources used for data transmissions, the SA transmissions 502, 504 may contain a field called T-RPT (i.e., time domain resource pattern of transmission). In some examples, T-RPT is a number that may be mapped to a bitmap indicating the time occurrence of all time resources used for data transmission. Using the T-RPT, the receiving UEs may learn the timing of the associated data transmissions 506, 508.

The timing of the data transmissions 506, 508, e.g., the T-RPT, is illustrated in FIG. 5. The horizontal axis is time, t. The vertical axis is frequency, f. In FIG. 5, UE1 and UE2 transmit SA transmissions 502, 504 in the SA resource pool and then transmit data transmissions 506, 508 in the data resource pool according to the T-RPT pattern. Transmitting SA transmissions 502, 504 in the SA resource pool and transmitting data transmissions 506, 508 in the data resource pool according to the T-RPT pattern allows in-band emissions diversity, i.e., emissions from different devices in the same frequency band. For example, emissions from different devices may be transmitted within an LTE frequency band.

Some examples of the systems and methods described herein may be based on material related to D2D communication for V2V in accordance with Release-12 of the LTE standard or other releases of the LTE standard or other communications standards that may incorporate V2V communications. Some examples may port legacy designs onto V2V applications. While Release 12 of the LTE standard includes D2D communication, which may be used for V2V, simulation results suggest that Release-12 resource selection methods, where both SA and T-RPT patterns are randomly selected, may not have good performance. Accordingly, some examples described herein may provide new resource allocation mechanisms that may improve performance, e.g., relative to both SA and T-RPT patterns that are randomly selected.

In some cases, in the context of a V2V application, a high density of vehicles may cause communication issues. For example, during "rush hour" there could be hundreds or thousands of vehicles on the highway, e.g., within a particular service area for a communications system. The large number of vehicles may need to contend for a limited amount of time-frequency resources. Having a high number of vehicles contend for a limited amount of time-frequency resources may cause high interference between communication devices on each vehicle. Accordingly, the performance of the communications system, or one or more communication devices in the communications system may be poor. Additionally, in-band emission may lead to near-far effects. Near-far effects, which may be a problem with communications systems, occurs when signals from vehicles that are nearby overpower signals from vehicles that are far away. One or more of these issues may be addressed using listen-before-schedule (LBS)/listen-before-talk (LBT) or location-based-resource allocation, as described herein.

Figure 6:
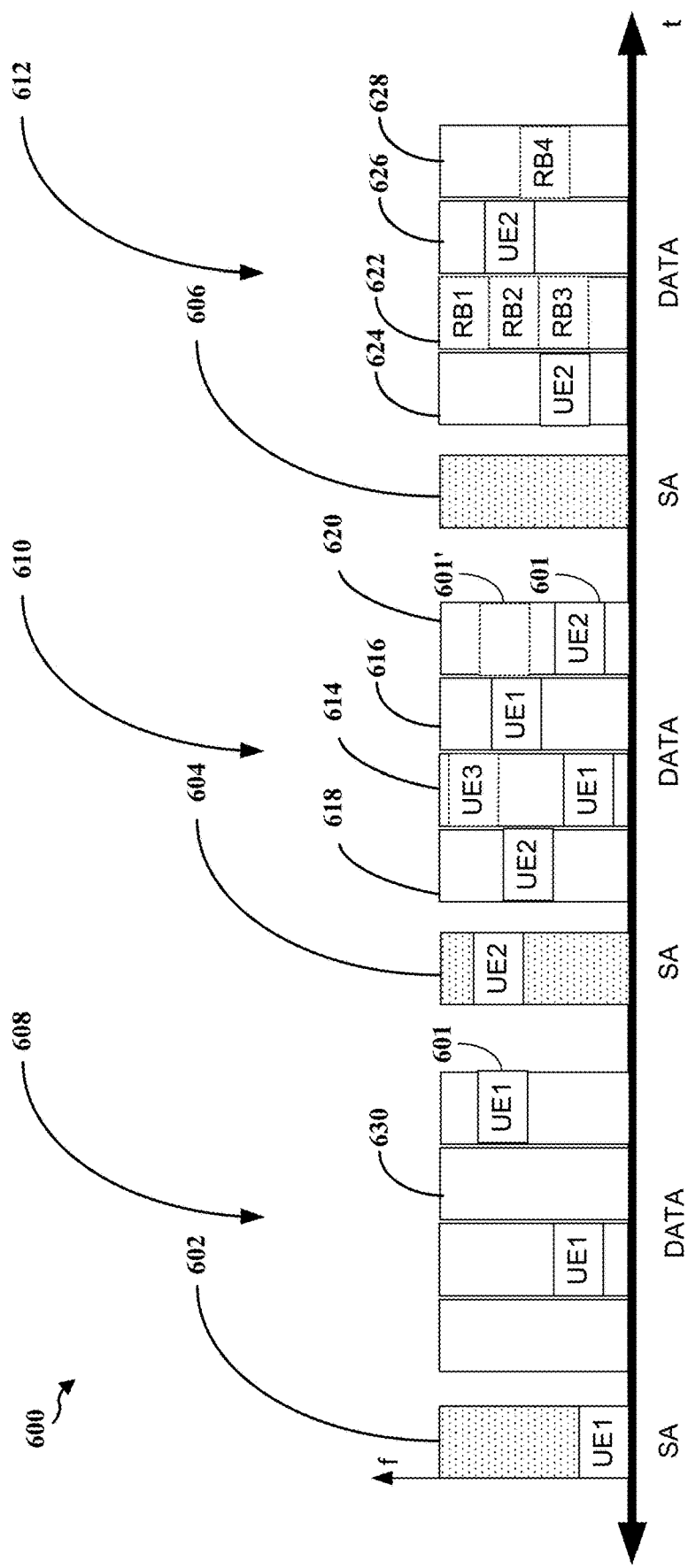
FIG. 6 is a diagram illustrating an example time-frequency resources in accordance with the systems and methods described herein.

FIG. 6 is a diagram 600 illustrating an example of time-frequency resources in accordance with the systems and methods described herein. Similar to FIG. 5, in FIG. 6, the x-axis may be time and the y-axis may be frequency. Accordingly, the diagram 600 illustrates an example of available times and available frequencies, i.e., time-frequency resources, that may be used for communications transmissions. Thus, the diagram 600 illustrates network resources. The network resources may be time-frequency resources. (The diagram 600 illustrates a graph with time on the x-axis and frequency on the y-axis.) These time-frequency resources may be split into blocks 601 of time and frequency such as the blocks of time-frequency resources used by UE1 and UE2 and the block 601' of time and frequency that is unassigned as illustrated in FIG. 6.

In some examples, resource allocation mechanisms for V2V communication may use time-frequency resources illustrated in FIG. 6 or similar time-frequency resources to the time-frequency resources illustrated in FIG. 6. As illustrated in FIG. 6, data transmissions may span two SA periods, e.g., UE1 transmits in SA periods 608, 610, and UE2 transmits in SA periods 610, 612.

FIG. 6 illustrates one example of LBT/LBS. LBT/LBS may provide better interference management. Some example LBT/LBS schemes may utilize SA information from SA transmissions 602, 604, 606 during each SA period to avoid choosing the resources that have been occupied by other neighboring users, i.e., other UE's. In one example, the LBT/LBS protocol works as follows: (1) in the legacy design, both SA and data transmissions are done within a single SA period. To enable LBT/LBS, one example allows data transmissions to span multiple SA periods 608, 610, 612 and the SA transmission 602 may still be done within the first SA period 608.

In an example method of wireless communication a UE, e.g., UE1, may receive at least one SA 604 from at least one UE (e.g., UE2). For example, referring back to FIG. 4, UE 468 may transmit an SA as part of a transmission between the UE 468 and the UE 470. The SA may be received by UE 470.

In an example method of wireless communication a UE, e.g., the UE 2, may receive at least one SA 602 from at least one UE (e.g., UE1). For example, referring back to FIG. 4, UE 470 may transmit an SA as part of a transmission between the UE 470 and the UE 468. The SA may be received by UE 468.

The UE (UE1, UE2) may determine an energy associated with each received at least one SA 604, 602. For example, the transmission between the UE 468 and the UE 470 has some energy associated with the transmission. The energy (at a receiver) will depend on the transmitted energy of the transmission between the UE 468 and the UE 470, the distance from UE 468 to UE 470, obstacles that may block the path of the signal of the transmission between the UE 468 and the UE 470 and any other factors that may impact an energy of a received signal.

The UE (UE1, UE2) may rank data transmission time-frequency resources based on the determined energy associated with each received SA. For example, referring to FIG. 6, if a third UE receives SA transmissions 602, 604 from UE1 and UE2, the third UE may determine an energy associated with each received SA 602 (UE1) and SA 604 (UE2). If it is assumed that the energy associated with each received SA 602, 604 may be the same, similar, or proportional to energy that may be received from data transmissions from UE1 and UE2, respectively, then the data transmissions for UE1 and UE2 (DATA) may be ranked based on the determined energy associated with each received at least one SA 602, 604. Each received at least one SA 602, 604 is associated with a different subset of the data transmission time-frequency resources. For example, SA 602 includes a transmission from UE1. SA 604 includes a transmission from UE2. SA 602, which includes a transmission from UE1 may be associated with UE1 data transmissions (blocks "UE1" during DATA transmissions). Similarly, SA 604, which includes a transmission from UE2 may be associated with UE2 data transmissions (blocks "UE2" during DATA transmissions).

The UE (e.g., UE3) may select a set of data transmission time-frequency resources based on the ranked data transmission time-frequency resources. For example, when UE3 ranks resources in subframes 614, 616 (used by UE1) as having lower energy than subframes 618, 620 (used by UE2) (the ranking of resources in subframes 614, 616, 618, 620 is based on the SAs received 602, 604), UE3 may select the set of data transmission time-frequency resources of subframes 614, 616 based on the lower energy ranking of the data transmission time-frequency resources of subframes 614, 616. Thus, a set of subframes associated with the data transmission time-frequency resources may be ranked based on the determined energy associated with said each received at least one SA. Accordingly, UE3 may send a data transmission on one or more of subframes 614, 616 (i.e., the selected set of data transmission time-frequency resources). For example, UE3 may transmit on subframes 614 as illustrated in FIG. 6.

In an example, the ranking of the data transmission time-frequency resources includes determining a number x of consecutive RBs for the data transmission. For example, a subframe 622 may include y consecutive RBs (RB1, RB2, RB3), where y≥x. The UE (e.g., UE3) may determine an average energy for each of the different subsets of x consecutive RBs (e.g., RB1/RB2, RB2/RB3 assuming x=2) within the y consecutive RBs (RB1, RB2, RB3), e.g., based on SA 602, 604.

The UE (e.g., UE3) may determine a lowest average energy for a subset of x consecutive RBs among subsets of x consecutive RBs in each subframe. For example, assuming x is equal to 2 and y is equal to 3, within subframe 622, when minimal transmissions occur on RB1 and RB2, and RB3 has a high average energy, RB1 and RB2 may be the subset of x consecutive RBs among subsets of x consecutive RBs (RB1/RB2, RB2/RB3) in subframe 622 with the lowest average energy.

The UE (e.g., UE3) may rank each subframe in the set of subframes based on the determined lowest average energy of the subframe. For example, if data transmissions are scheduled for each RB RB1, RB2, RB3 by UE1 and UE1 has a relatively high energy SA 602, the lowest average energy of subframe 622 is relatively high. If the subframes are ranked in the increasing order of the "lowest average energy", subframe 622 should be ranked low.

In an example, selecting the set of data transmission time-frequency resources may include determining n subframes of the set of subframes with the smallest "lowest average energy" and selecting k subframes from the determined n subframes. For example, selecting the set of data transmission time-frequency resources may include determining n subframes 624, 626, 628 (e.g., n=3) of the set of subframes 622, 624, 626, 628 with the smallest "lowest average energy". Selecting the set of data transmission time-frequency resources may also include selecting k subframes 624 (e.g., k=1) from the determined n subframes. The k subframes are selected randomly from the determined n subframes. For example, a selection among subframe 624, 626, and 628 may be a random selection.

In an example, the selecting the set of data transmission time-frequency resources comprises assigning weights to subframes in the n subframes 624, 626, 628 based on the determined average energy for the different subsets of x consecutive RBs. Accordingly, subframes 624, 626 may be assigned the same weight, while subframe 628 may be assigned a weight based on the average energy for RB4. The k subframes may be selected based on a probability associated with the weights assigned to each subframe of the n subframes. Accordingly, if each RB has the same average energy, subframes 624, 626, 628 may each be assigned the same weight and the probabilities may be equal. In another example, if subframe 628 has a lower energy, subframe 628 may be assigned a weight of 2, while subframes 624, 626 may be assigned a weight of 1 each. The total of the weights in the example is 2+1+1=4. Accordingly, if a single subframe is selected, subframe 628 may have a 50% probability of being selected (e.g., 2/4), while each of subframes 624, 626 may have a 25% probability of being selected (e.g., 1/4).

In an example, determining the energy, the ranking of the data transmission time-frequency resources, and the selecting based on the ranked data transmission time-frequency resources occurs when the UE has a periodic message to send. For example, various data transmissions of the UEs, UE1, UE2 may be periodic. In an example, the determining the energy, the ranking of the data transmission time-frequency resources, and the selecting based on the ranked data transmission time-frequency resources described herein only occurs for when the UE has a periodic message to send. In an example, the UE (UE1, UE2) randomly selects the data transmission time-frequency resources (e.g., subframe 630) when the UE does not have a periodic message to send.

In an example, a user equipment, e.g., UE1, UE2, may monitor the channel use by decoding SA information from other users. For example, UE1 may monitor UE2 (and other UEs) and UE2 may monitor UE1 (and other UEs). In some examples, SA transmissions indicate locations of data, e.g., in time and/or frequency. In other words, SA transmissions may indicate time-frequency resources used for data. The occupied data resources are marked, i.e., noted by one or more of the UEs. One or more UEs may estimate energy at a data location, e.g., at a time-frequency resource based on the energy received on the SA transmission 602. Accordingly, one or more UEs (UE1, UE2) may measure energy received from the SA transmission 602, 604 and use the measurement of the energy received on the SA transmission 602 as an estimation of energy at a data location, e.g., at time-frequency resource.

In an example, for a transmission, a UE ranks resources based on the estimated received energy. If a UE is planning to transmit on x RBs in a subframe, for each subframe the UE may find the x consecutive resources with the lowest average estimated energy. Then the UE may rank subframes based on this estimated energy. If a UE needs to transmit on k subframes, the UE may randomly select k out of n subframes with the smallest lowest average estimated energy.

Other criteria for ranking of subframes could also be used. For example, subframes could be assigned weights derived from the x RB estimated energy and their probability of selection might be based on the weights. Some example systems may avoid choosing resources with the lowest energy to avoid or lower the probability of a case where two proximal UEs select the exact same resources.

As illustrated in FIG. 6, UE1 transmits the SA transmission 602 in the first SA period 608 and transmits data in both the first SA period 608 and second SA period 610. UE2 starts transmission in the second SA period 610. If UE2 can decode the SA from UE1, UE2 should avoid choosing the second subframe 614 and the third subframe 616 in the second SA period 610 that has been occupied by UE1. Accordingly, in the illustrated example of FIG. 6, UE2 selects the first subframe 618 and the fourth subframe 620 in the second SA period 610. Additionally, as no resources are occupied in the third SA period 612, any resource in the third SA period 612 is available and may be randomly selected by UE2 from the corresponding data pool. As discussed above, the LBT/LBS design discussed with respect to FIG. 6 may reduce interference between UEs.

Figure 7:
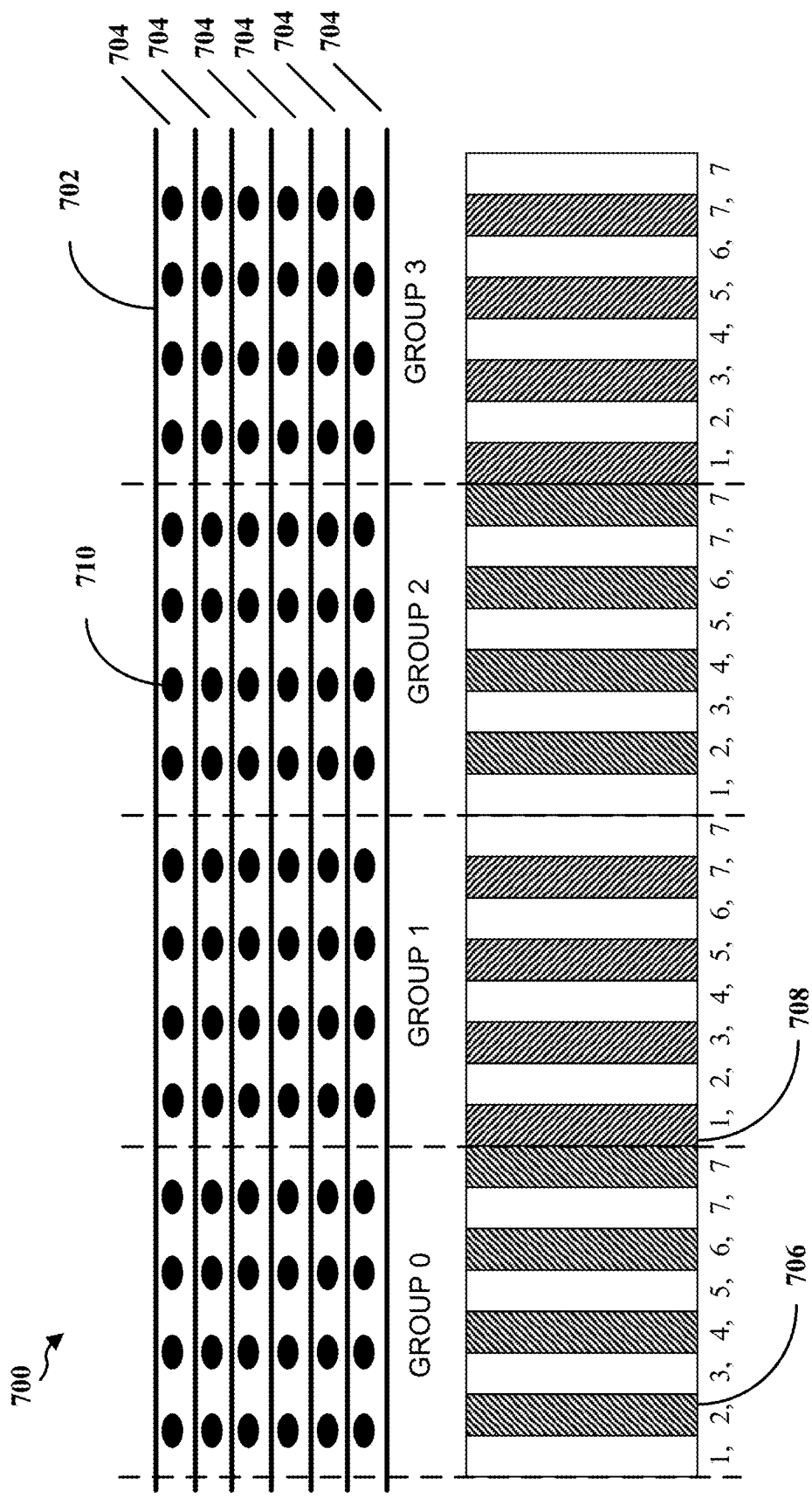
FIG. 7 is a diagram illustrating an example of location groupings in accordance with the systems and methods described herein.

In some examples, the location-based resource allocation scheme may include one or more of the following. First, all time-frequency resources may be partitioned into different resource groups. The partition may be done in a time domain manner. Second, users may be divided into groups based on location. (For example, the groupings discussed below with respect to FIG. 7 are based on location.) Additionally, the mapping from user group to resource group may be determined statically or configured dynamically by the network. Static mappings may be mappings that are predetermined and may be fixed. For dynamically mapping, a network may change mappings based on network or device conditions.

FIG. 7 is a diagram 700 illustrating an example of location groupings, e.g., GROUP 0, GROUP 1, GROUP 2, GROUP 3, in accordance with the systems and methods described herein. By using location groupings, location-based resource allocation may be achieved. The location information used to determine the groupings based on location may be obtained from sources like GPS, which may be readily available in connected cars. Proximal UEs may belong to the same group. Proximal UEs may select resources from the same resource group using, for example, LBT/LBS. The grouping of proximal UEs, potentially with LBT/LBS may reduce the near-far effect because groups are made up of UEs close together that will generally transmit with similar energy levels. Thus, one energy level from one UE will generally be less likely to overpower another energy level from another UE.

FIG. 7 is a diagram 700 that illustrates an example highway 702 with, for example, six lanes 704 in total. All users (e.g., in vehicles 710) may be divided into four groups, e.g., GROUP 0, GROUP 1, GROUP 2, GROUP 3, according to their locations. The vehicles, e.g., vehicle 710, may have a UE. Accordingly, vehicle (e.g., vehicle 710) UEs may be divided into vehicle UE groups, e.g., GROUP 0, GROUP 1, GROUP 2, GROUP 3. For example, GROUP 0, GROUP 1, GROUP 2, GROUP 3 each include twenty four vehicles, such as vehicle 710, and each vehicle may include one or more UEs. (It will be understood that vehicle groups may have more or fewer vehicles. Additionally, while each vehicle group GROUP 0, GROUP 1, GROUP 2, GROUP 3 includes twenty-four vehicles, it will be understood that generally, vehicle groups may have different numbers of vehicles from each other.)

As illustrated in FIG. 7, time-frequency resources may be divided into different resource groups, e.g., subframes 1, 2, 3, 4, 5, 6, 7, 8. In the simplified example of FIG. 7, there are only two resource groups, e.g., even and odd. The two resource groups contain even subframes (e.g., subframe 706) and odd subframes (e.g., subframe 708), respectively.

The time-frequency resources, e.g., radio resources, may be partitioned in the time domain. For example, even subframes 706 and odd subframes 708 may be separated or partitioned into time slots. Accordingly, the resource groups may be made up of a series of odd subframes 708, e.g., 1, 3, 5, 7 and a series of even subframes 706, e.g., 2, 4, 6, 8, with the subframes occurring in an order 1, 2, 3, 4, 5, 6, 7, 8 in the time domain.

One example may map vehicle UE groups, e.g., GROUP 0, GROUP 1, GROUP 2, GROUP 3, to resource groups, e.g., even subframes 706 and odd subframes 708. One mapping from a user group to a resource group is for the even groups (e.g., GROUP 0, GROUP 2) to only be allowed to use even subframes 706, e.g., 2, 4, 6, 8 and for the odd groups (e.g., GROUP 1, GROUP 3) to only be allowed to use odd subframes 708, e.g., 1, 3, 5, 7. By always using different subframes 706, 708 for neighboring groups, interference and near-far effects between neighboring groups may be reduced or eliminated. For example, users in GROUP 0 may use even subframes. Signals from the users in the neighboring group, GROUP 1, generally will not interfere with the signals from users in GROUP 0 because subframes 1, 3, 5, 7 occur at different times from subframes 2, 4, 6, 8. Additionally, because users in a particular group are generally in a similar geographic area, each user in a group may, in some cases, receive similar power from other users in the same group. Receiving similar power may decrease the near-far effects.

An example apparatus for wireless communication includes a memory and at least one processor coupled to the memory. The at least one processor is configured to receive at least one SA from at least one UE. The at least one processor is further configured to determine an energy associated with each received at least one SA. Additionally, the at least one processor is configured to rank data transmission time-frequency resources based on the determined energy associated with said each received at least one SA. The each received at least one SA is associated with a different subset of the data transmission time-frequency resources. Additionally, the at least one processor is configured to select a set of data transmission time-frequency resources based on the ranked data transmission time-frequency resources. The at least one processor is also configured to send a data transmission on the selected set of data transmission time-frequency resources.

In an example a set of subframes associated with the data transmission time-frequency resources are ranked based on the determined energy associated with said each received at least one SA. In another example, the ranking of the data transmission time-frequency resources includes determining a number x of consecutive resource blocks (RBs) for the data transmission, determining an average energy for each of different subsets of x consecutive RBs, determining a lowest average energy for a subset of x consecutive RBs among subsets of x consecutive RBs in each subframe, and ranking each subframe in the set of subframes based on the determined lowest average energy of the subframe.

In an example, the selecting the set of data transmission time-frequency resources includes determining n subframes of the set of subframes with the smallest lowest average energy and selecting k subframes from the determined n subframes. In another example, the k subframes are selected randomly from the determined n subframes.

In an example, selecting the set of data transmission time-frequency resources includes assigning weights to subframes in the n subframes based on the determined average energy for the different subsets of x consecutive RBs. The k subframes are selected based on a probability associated with the weights assigned to each subframe of the n subframes.

In an example, the data transmission time-frequency resources are partitioned by time into a plurality of different time-frequency resource groups.

In an example the at least one processor is configured to receive information indicating a group of time-frequency resources assigned to the UE of the different time-frequency resource groups.

In an example, the set of data transmission time-frequency resources associated with the ranking and the selecting are within the assigned group of time-frequency resources.

In another example, the determining the energy, the ranking of the data transmission time-frequency resources, and the selecting based on the ranked data transmission time-frequency resources occurs when the UE has a periodic message to send. The UE may randomly select the data transmission time-frequency resources when the UE does not have a periodic message to send.

In an example, an apparatus (102, 310, 462) for wireless communication includes a memory (376). The apparatus (102, 102', 310, 462) includes at least one processor (316, 370, 375) coupled to the memory (376). The at least one processor (316, 370, 375) is configured to partition time-frequency resources (e.g., time-frequency resources illustrated in FIG. 6) into different resource groups (e.g., even subframes 706 and odd subframes 708 of FIG. 7). The resource groups are partitioned in the time domain (e.g., partitioned along the time axis, i.e., the x-axis of FIG. 6). The at least one processor (316, 370, 375) is configured to divide vehicle UEs (104, 350, 464, 466, 468, 470) into vehicle UE groups (e.g., GROUP 0, GROUP 1, GROUP 2, GROUP 3 of FIG. 7) based on vehicle location. The at least one processor (316, 370, 375) is configured to map the UE groups (GROUP 0, GROUP 1, GROUP 2, GROUP 3) to the resource groups (e.g., 706, 708). For example, GROUP 0 and GROUP 2 may be mapped to even subframes 806 and GROUP 1 and GROUP 3 may be mapped to odd subframes 708. (Other mappings are also possible.)

In an example, the mapping of the vehicle UE groups is determined statically. In another example, the mapping of the vehicle UE groups is configured dynamically by a network. In an example, proximal vehicle UEs (e.g., vehicle UEs within a group such as GROUP 0 of FIG. 7 are proximal) are selected for a same group (e.g., GROUP 0). In an example, the proximal vehicle UEs may select resources for the same resource group using listen-before-schedule (LBS).

Figure 8:
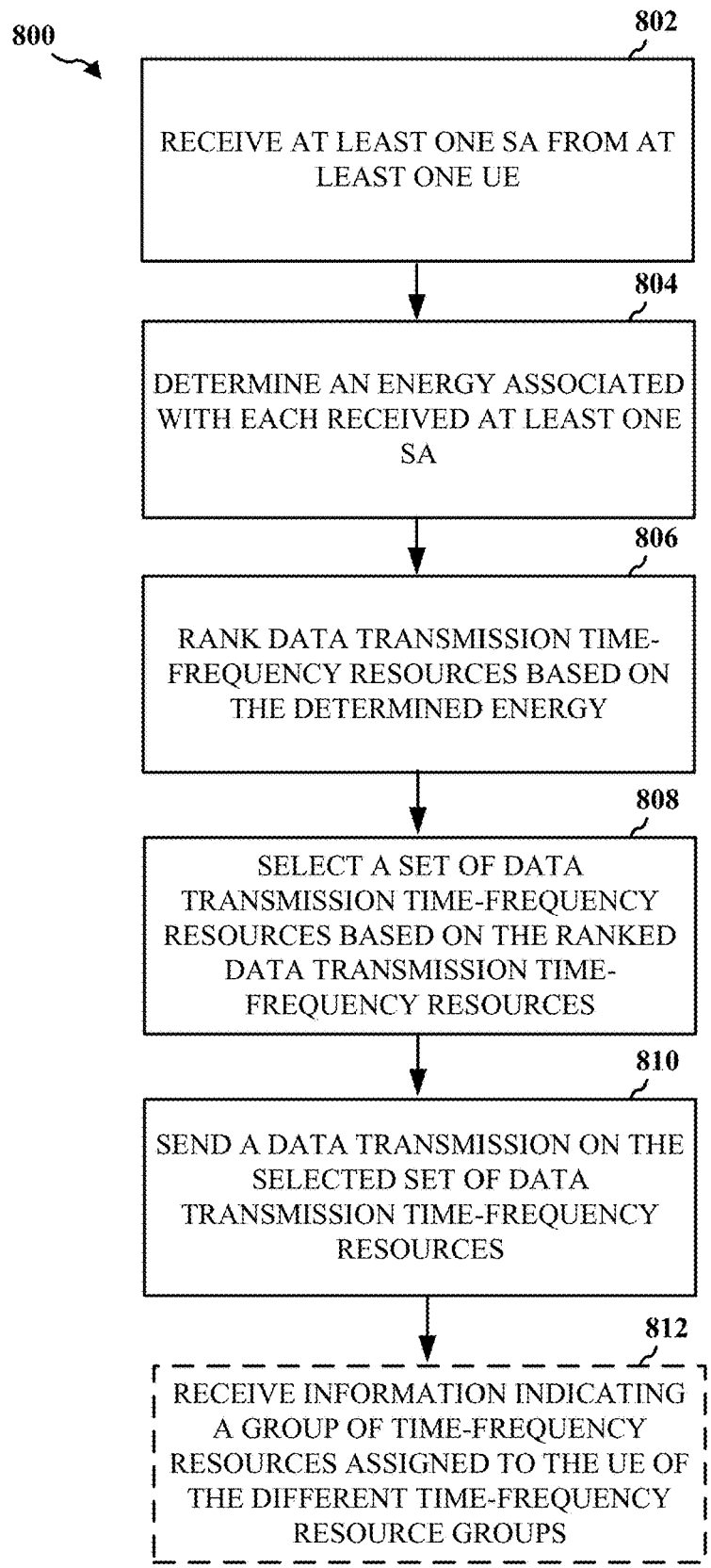
FIG. 8 is a flowchart of a method of wireless communication in accordance with the systems and methods described herein.

FIG. 8 is a flowchart 800 of a method of wireless communication in accordance with the systems and methods described herein. The method may be performed by a UE (e.g., the UE 104 of FIG. 1, UE 350 of FIG. 3, and UE 464, 466, 468, 470 of FIG. 4). The UE 104, 350, 464, 466, 468, 470 may be installed in a vehicle for V2V communications. At block 802, the UE 104, 350, 464, 466, 468, 470 receives at least one SA from at least one UE. For example, as illustrated in FIG. 6, UE1 transmits the SA transmission 602 in the first SA period. Similarly, UE2 transmits the SA transmission 604 in the second SA period.

At block 804, the UE 104, 350, 464, 466, 468, 470 determining an energy associated with each received at least one SA. For example, UE1 (FIG. 6) may monitor a channel for SA transmissions from UE2 (FIG. 6). Conversely, UE2 may monitor the channel for SA transmissions from UE1. In an example, a UE, UE3 may determine an energy associated with each received at least one SA, 602, 604.

At block 806, the UE 104, 350, 464, 466, 468, 470 ranks data transmission time-frequency resources based on the determined energy associated with said each received at least one SA. For example, if a UE is planning to transmit on a number of RBs on a subframe, e.g., x RBs, for each subframe, the UE will rank data transmission time-frequency resources based on the determined energy associated with said each received at least one SA 602, 604. The UE may find the x consecutive resources with the lowest average x RB estimated energy. Then the UE will rank subframes based on this estimated energy.

At block 808, the UE 104, 350, 464, 466, 468, 470 selects a set of data transmission time-frequency resources based on the ranked data transmission time-frequency resources. For example, a UE may select a set of data transmission time-frequency resources (e.g., subframes 624, 626) based on the ranked data transmission time-frequency resources.

At a block 810, the UE 104, 350, 464, 466, 468, 470 sends a data transmission on the selected set of data transmission time-frequency resources. For example, the UE 104, 350, 464, 466, 468, 470 may send a data transmission (DATA) on the selected set of data transmission time-frequency resources, e.g., subframes 624, 626.

At a block 812, the UE 104, 350, 464, 466, 468, 470, may receive information indicating a group of time-frequency resources assigned to the UE of the different time-frequency resource group.

Figure 9:
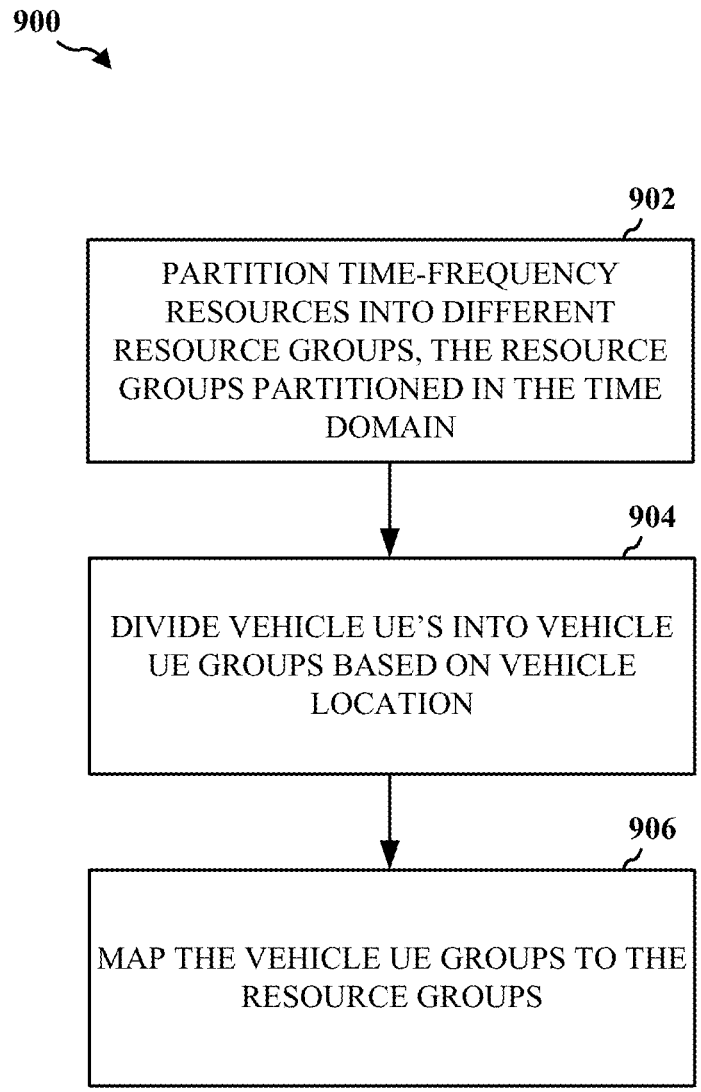
FIG. 9 is a flowchart of a method of wireless communication in accordance with the systems and methods described herein.

FIG. 9 is a flowchart 900 of a method of wireless communication in accordance with the systems and methods described herein. At block 902, an eNB 102, 310, 462 may partition time-frequency resources into different resource groups. For example, an eNB 102, 310, 462 may partition time-frequency resources (806, 808) into different resource groups. The resource groups (806, 808) may be partitioned in the time domain. For example, the proximal UEs (e.g., in vehicle 810) may select resources for a same resource group using LBS.

At block 904, an eNB 102, 310, 462 may divide vehicle UEs 104, 350, 464, 466, 468, 470 into vehicle UE groups based on location. (UEs 104, 350, 464, 466, 468, 470 may be installed in vehicles) For example, an eNB 102, 310, 462 may divide UEs 104, 350, 464, 466, 468, 470 (e.g., in vehicle 810) into vehicle UE groups (GROUP 0, GROUP 1, GROUP 2, GROUP 3) based on location (e.g., locations along highway 802). Proximal vehicle UEs may be selected for the same group. For example, a device implementing the method of wireless communication may receive location data of the group of vehicle UEs. Using the location data, vehicle UEs located near each other may be grouped together. Accordingly, using the location data, the device implementing the method may group the vehicle UEs near each other together into vehicle UE groups based on location.

At block 906, an eNB 102, 310, 462 may map the vehicle UE groups to the resource groups. For example, an eNB 102, 310, 462 may map the vehicle UE groups (GROUP 0, GROUP 1, GROUP 2, GROUP 3) to the resource groups (806, 808). In one example, the mapping of the vehicle UE groups may be determined statically. In another example, a network may configure the mapping of the vehicle UE groups dynamically. Examples described with respect to FIG. 9 have been described using an eNB. It will be understood that other devices, including vehicle UEs may implement the method of FIG. 9. For example, vehicle UEs may collectively implement the method of FIG. 9. In other examples, individual devices such as vehicle UEs may implement the method of FIG. 9.

Figure 10:
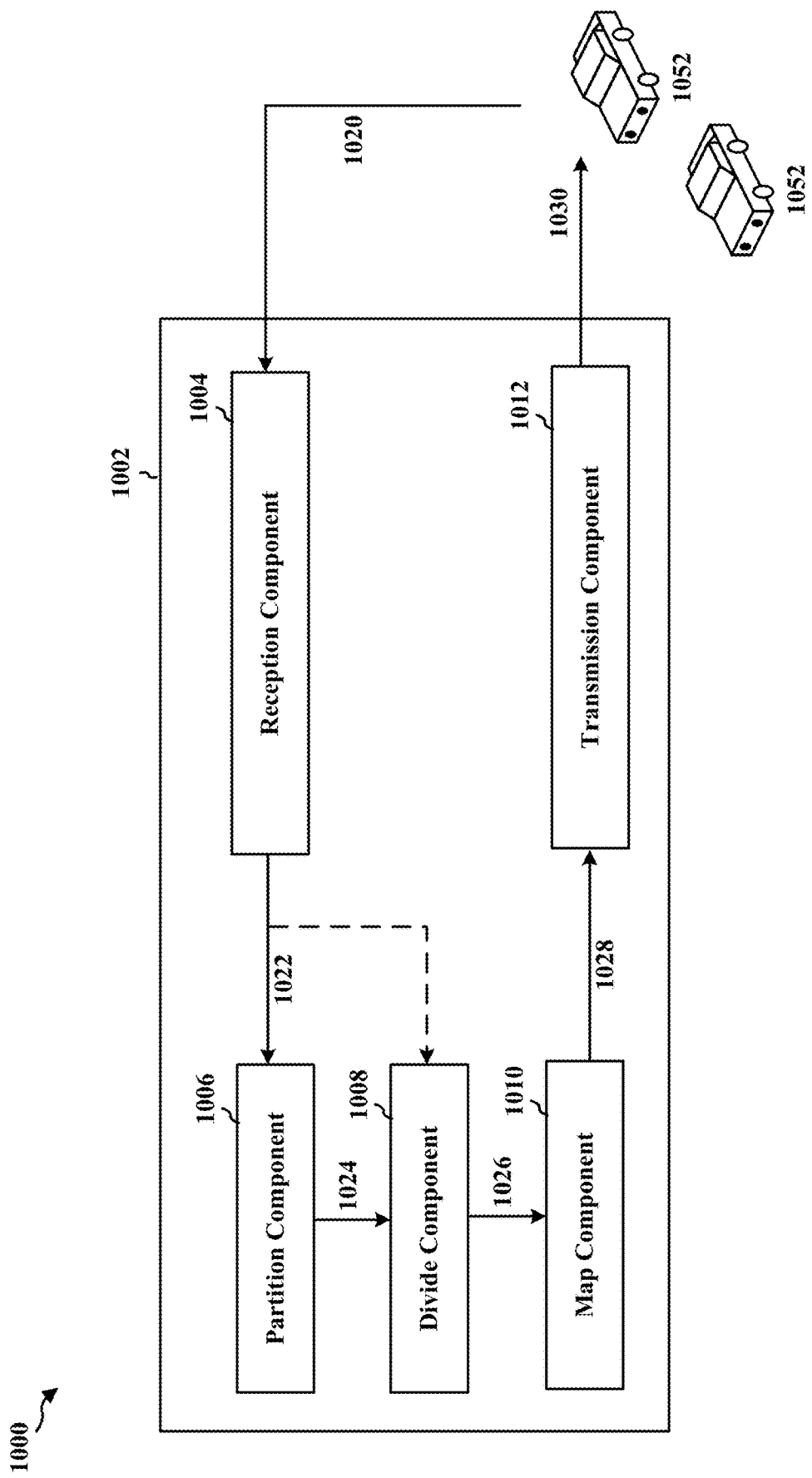
FIG. 10 is another conceptual data flow diagram illustrating the data flow between different means/components in an exemplary apparatus.

FIG. 10 is another conceptual data flow diagram 1000 illustrating the data flow between different means/components in an exemplary apparatus 1002. The apparatus may be an eNB. The apparatus includes a reception component 1004, a partition component 1006, a divide component 1008, a map component 1010, and a transmission component 1012.

The partition component 1006 partitions time-frequency resources into different resource groups. The resource groups are partitioned in the time domain. The divide component 1008 divides vehicle UEs into vehicle UE groups based on location. The locations may be received from vehicle UEs (e.g., in vehicles 1052) over a transmission 1020 received by the reception component 1004. The reception component 1004 passes the data 1022 to the partition component 1006, which may pass the data 1024 to the divide component 1008. (Alternatively, the divide component 1008 may be directly connected to the reception component 1004.) In an example, proximal vehicle UEs may be selected for a same group. In an example, proximal vehicle UEs select resources for a same resource group using LBS.

The map component 1010 maps the received vehicle UE groups 1026 to the resource groups. (The vehicle UE groups 1026, e.g., from the divide component 1008, may be received from data 1024 from the partition component 1006 or may be received from the data 1022 received by the divide component 1008 directly from the receive component 1004.) The map component 1010 may output 1028 the mapping of the received vehicle UE groups 1026 to the resource groups to the transmit component 1012 for transmission 1030 of the groupings. In an example, the mapping of the vehicle UE groups may be determined statically. In another example, a network may configure the mapping of the vehicle UE groups dynamically.

The apparatus may include additional components that perform each of the blocks of the algorithm in the aforementioned flowchart of FIG. 9. As such, each block in the aforementioned flowchart of FIG. 9 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
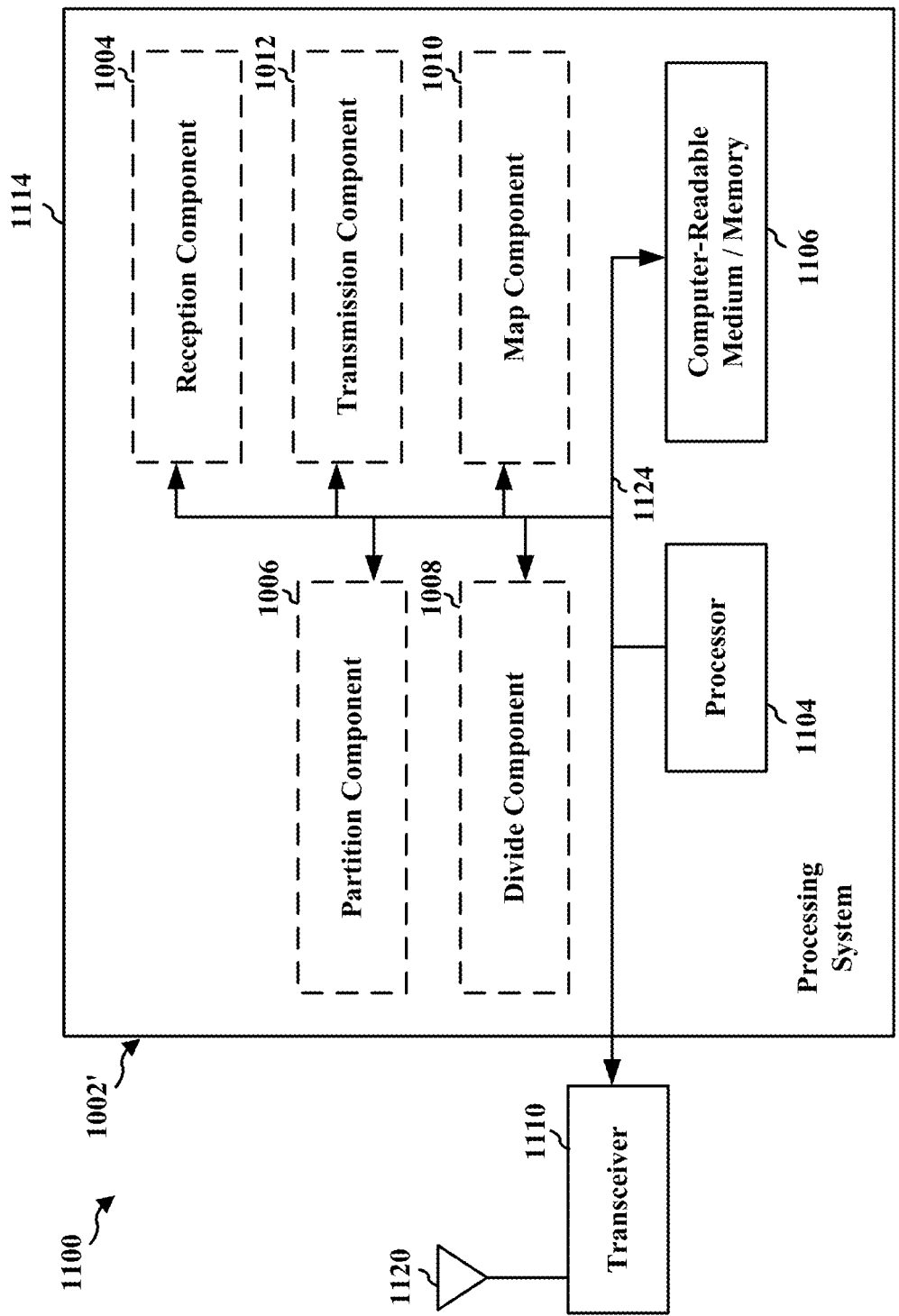
FIG. 11 is another diagram illustrating an example of a hardware implementation for an apparatus employing a processing system.

FIG. 11 is another diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114; specifically the reception component may receive information on resources such as vehicle UE location information so that the apparatus 1002' may map vehicle UE groups to the resource groups. In addition, the transceiver 1110 receives information from the processing system 1114, specifically the transmission component may transmit information to one, or more of the vehicle UEs in the vehicle UE groups, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375.

In one configuration, the apparatus 1002/1002' for wireless communication includes means for partitioning time-frequency resources into different resource groups. The resource groups are partitioned in the time domain. Accordingly, the means for partitioning time-frequency resources into different resource groups may determine a start time of a time-frequency resource. Additionally, the means for partitioning time-frequency resources into different resource groups may determine an end time of the time-frequency resource. Thus, a time-frequency resource may be split into different time components.

The apparatus 1002/1002' for wireless communication includes means for dividing vehicle UEs into vehicle UE groups based on location. The means for dividing vehicle UEs into vehicle UE groups based on location may determine vehicle location for one or more vehicles, e.g., using GPS location. The means for dividing vehicle UEs into vehicle UE groups based on location may have or may determine a threshold distance that defines locations that are considered "close" together or that defines areas for UE groups. The means for dividing vehicle UEs into vehicle UE groups based on location may add vehicles to a group that are "close" together based on the threshold or within areas that define the UE groups.

The apparatus 1002/1002' for wireless communication includes means for mapping the vehicle UE groups to the resource groups. For example, the means for mapping the vehicle UE groups to the resource groups may select a first vehicle UE group. Additionally, the means for mapping the vehicle UE groups to the resource groups may select a first resource group. The first UE vehicle group may use the first resource group. Similarly, the means for mapping the vehicle UE groups to the resource groups may select a second vehicle UE group. Additionally, the means for mapping the vehicle UE groups to the resource groups may select a second resource group. The second UE vehicle group may use the second resource group.

The aforementioned means may be one or more of the aforementioned components of the exemplary apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
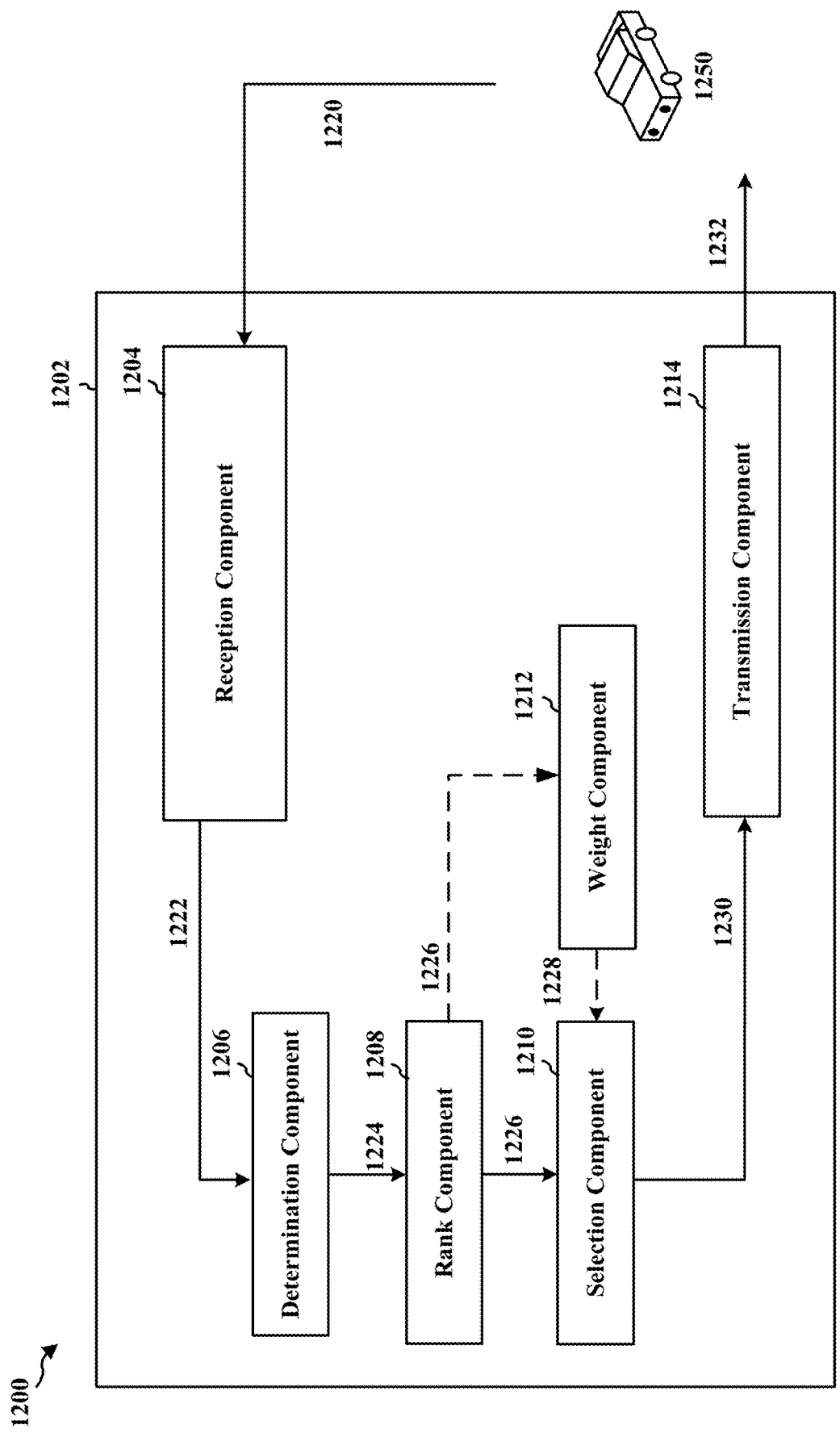
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE. The apparatus includes a reception component 1204, a determination component 1206, a rank component 1208, a selection component 1210, a weight component 1212, and a transmission component 1214.

The reception component 1204 may receiving at least one SA (in transmission 1220) from at least one UE (e.g., in vehicle(s) 1250). The determination component 1206 may receive information 1222 related to SA from the transmission 1220 and determine an energy associated with each received at least one SA.

The rank component 1208 may receive the energy determination 1224 and rank data transmission time-frequency resources based on the determined energy associated with said each received at least one SA (from transmission 1220). The each received at least one SA is associated with a different subset of the data transmission time-frequency resources.

The selection component 1210 may receive the ranking 1226 and select a set of data transmission time-frequency resources based on the ranked data transmission time-frequency resources. In another example, the weight component 1212 may receive ranking 1226 and determine a series of weights to be to be assigned to subframes. The weight component 1212 may pass the weights 1228 to the selection component 1210. The selection component may use the weights 1228 in selecting the set of data transmission time-frequency resources based on the ranked data transmission time-frequency resources. (The weights may be based on the rankings.)

The transmission component 1214 may receive the selected time-frequency resources 1230 and use the selected time-frequency resources for transmissions. For example, the transmission component 1214 may transmit (or send) a data transmission 1232 on the selected set of data transmission time-frequency resources.

Additionally, in an example, the reception component 1204 may receive information (e.g., over transmission 1220) indicating a group of time-frequency resources assigned to the UE of the different time-frequency resource groups.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
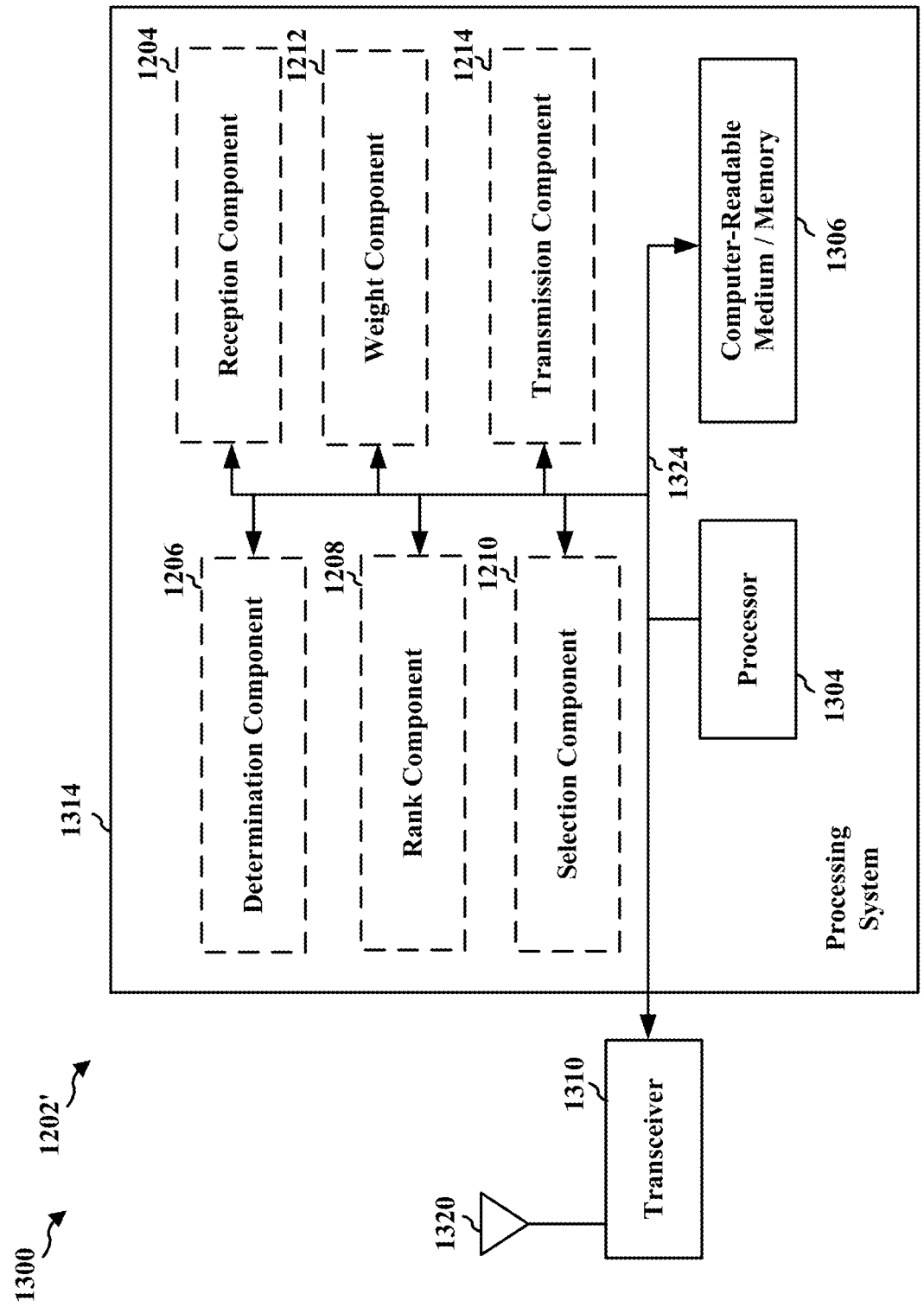
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, (not shown 1206, 1208, e.g., within 1204), 1210, 1212, 1214, 1216, 1218, 1220, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314; specifically the reception component may receive signals, monitors a channel including SA transmissions from a second UE, and decodes the SA transmissions from the second UE. In addition, the transceiver 1310 receives information from the processing system 1314, specifically the transmission component may transmit SA transmissions for multiple data transmissions spanning multiple SA periods in a first SA period, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218, 1220. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for receiving at least one SA from at least one UE. The apparatus 1202/1202' for wireless communication also includes means for determining an energy associated with each received at least one SA. Additionally, the apparatus 1202/1202' for wireless communication includes means for ranking data transmission time-frequency resources based on the determined energy associated with said each received at least one SA. The each received at least one SA being associated with a different subset of the data transmission time-frequency resources. Additionally, the apparatus 1202/1202' for wireless communication includes means for selecting a set of data transmission time-frequency resources based on the ranked data transmission time-frequency resources. The apparatus 1202/1202' for wireless communication also includes means for sending a data transmission on the selected set of data transmission time-frequency resources.

In an example, the apparatus 1202/1202' for wireless communication includes means for receiving information indicating a group of time-frequency resources assigned to the UE of the different time-frequency resource groups (e.g., transceiver 1310 and/or reception component 1204).

The means for receiving at least one SA from at least one UE may include transceiver 1310 and/or reception component 1204. The means for determining an energy associated with each received at least one SA may measure an energy associated with each received at least one SA and quantify the measurement for transmission as a value to other components.

The means for ranking the data transmission time-frequency resources may be configured to determine a number x of consecutive RBs for the data transmission, determine an average energy for each of different subsets of x consecutive RBs, determine a lowest average energy for a subset of x consecutive RBs among subsets of x consecutive RBs in each subframe, and rank each subframe in the set of subframes based on the determined lowest average energy of the subframe.

The means for selecting the set of data transmission time-frequency resources may be configured to determine n subframes of the set of subframes with the smallest lowest average energy and select k subframes from the determined n subframes. The k subframes are selected randomly from the determined n subframes. The means for selecting the set of data transmission time-frequency resources may assign weights to subframes in the n subframes based on the determined average energy for the different subsets of x consecutive RBs. The k subframes are selected based on a probability associated with the weights assigned to each subframe of the n subframes.

The means for sending a data transmission on the selected set of data transmission time-frequency resources may include transceiver 1310 and/or transmission component 1214.

In one configuration, the apparatus 1202/1202' for wireless communication includes means for transmitting (1220) SA transmissions for multiple data transmissions spanning multiple SA periods in a first SA period. The apparatus 1202/1202' for wireless communication also includes means for monitoring (e.g., within reception component 1204) a channel including SA transmissions from a second UE. Additionally, the apparatus 1202/1202' for wireless communication includes means for decoding (e.g., within reception component 1204) the SA transmissions from the second UE. The apparatus 1202/1202' for wireless communication also includes means for estimating energy (1206) that will be received for a data transmission from the second UE based on the energy received from the SA transmissions from a second UE. Additionally, the apparatus 1202/1202' for wireless communication includes means for ranking (1214) time-frequency resources based on the estimated received energy. The apparatus 1202/1202' for wireless communication also includes means for selecting (1216) data transmission resources based on the ranking.

The apparatus 1202/1202' for wireless communication may further include means for determining (1210) a lowest average estimated received energy over a number of consecutive RBs when the UE is going to transmit on the number of consecutive RBs in a sub-frame. The apparatus 1202/1202' for wireless communication may also include means for ranking (1214) sub-frames based on this estimated energy. The apparatus 1202/1202' for wireless communication may further include means for randomly selecting (1216) k out of n sub-frames with the smallest lowest average estimated received energy over the number of consecutive RBs when the UE is going to transmit on k sub-frames and n is less than a total number of available sub-frames. The apparatus 1202/1202' for wireless communication may further include means for assigning weights (1218) derived from the estimated received energy of the number of consecutive RBs. The probability of the number of consecutive RBs being selected may be based on the weights derived from the estimated received energy of the number of consecutive RBs.

The aforementioned means may be one or more of the aforementioned components of the exemplary apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
partitioning time-frequency resources into different resource groups, the resource groups partitioned in the time domain, wherein the resource groups comprise a resource group of odd subframes and a resource group of even subframes;
dividing vehicle UEs into vehicle UE groups based on vehicle UE location; and
mapping the vehicle UE groups to the resource groups, wherein neighboring groups of the vehicle UE groups are mapped to different ones of the resource group of odd subframes or the resource group of even subframes.

2. The method of claim 1, wherein the mapping of the vehicle UE groups is determined statically.

3. The method of claim 1, wherein the mapping of the vehicle UE groups is configured dynamically by a network.

4. The method of claim 1, wherein proximal vehicle UEs are selected for a same vehicle UE group.

5. An apparatus for wireless communication, comprising:
means for partitioning time-frequency resources into different resource groups, the resource groups partitioned in the time domain, wherein the resource groups comprise a resource group of odd subframes and a resource group of even subframes;
means for dividing vehicle UEs into vehicle UE groups based on vehicle UE location; and
means for mapping the vehicle UE groups to the resource groups, wherein neighboring groups of the vehicle UE groups are mapped to different ones of the resource group of odd subframes or the resource group of even subframes.

6. The apparatus of claim 5, wherein the means for mapping of the vehicle UE groups is configured to determine a mapping statically.

7. The apparatus of claim 5, wherein the means for mapping of the vehicle UE groups is configured to map dynamically.

8. The apparatus of claim 5, wherein proximal vehicle UEs are selected for a same vehicle UE group.

9. An apparatus of wireless communication, comprising:
a memory; and
at least one processor coupled to the memory and configured to:
partitioning time-frequency resources into different resource groups, the resource groups partitioned in the time domain, wherein the resource groups comprise a resource group of odd subframes and a resource group of even subframes;
dividing vehicle UEs into vehicle UE groups based on vehicle UE location; and
mapping the vehicle UE groups to the resource groups, wherein neighboring groups of the vehicle UE groups are mapped to different ones of the resource group of odd subframes or the resource group of even subframes.

10. The apparatus of claim 9, wherein the at least one processor determines the mapping of the vehicle UE groups statically.

11. The apparatus of claim 9, wherein the at least one processor determines the mapping of the vehicle UE groups dynamically.

12. The apparatus of claim 9, wherein the at least one processor selects proximal vehicle UEs for a same vehicle UE group.

13. A non-transitory computer-readable medium storing computer executable code, comprising code to:
partition time-frequency resources into different resource groups, the resource groups partitioned in the time domain, wherein the resource groups comprise a resource group of odd subframes and a resource group of even subframes;
divide vehicle UEs into vehicle UE groups based on vehicle UE location; and
map the vehicle UE groups to the resource groups, wherein neighboring groups of the vehicle UE groups are mapped to different ones of the resource group of odd subframes or the resource group of even subframes.

* * * * *